(12) United States Patent
Ide et al.

(10) Patent No.: US 7,027,641 B2
(45) Date of Patent: Apr. 11, 2006

(54) THREE-DIMENSIONAL SHAPE MEASURING SYSTEM

(75) Inventors: Eiichi Ide, Itami (JP); Koichi Kamon, Takatsuki (JP); Fumiya Yagi, Toyonaka (JP); Takashi Kondo, Sakai (JP)

(73) Assignee: Minolta Co., Ltd., Osaka (JP)

( * ) Notice: Subject to any disclaimer, the term of this patent is extended or adjusted under 35 U.S.C. 154(b) by 365 days.

(21) Appl. No.: 09/748,138

(22) Filed: Dec. 27, 2000

(65) Prior Publication Data

US 2001/0012016 A1     Aug. 9, 2001

(30) Foreign Application Priority Data

Dec. 27, 1999   (JP)   ................... 11-369029

(51) Int. Cl.
*G06K 9/00*   (2006.01)

(52) U.S. Cl. ...................... 382/154; 356/5.04

(58) Field of Classification Search ................ 382/154; 345/419, 422; 356/5.04, 613; 348/47–50, 348/51; 250/559.22, 559.23, 559.34

See application file for complete search history.

(56) References Cited

U.S. PATENT DOCUMENTS

| 4,559,597 | A |   | 12/1985 | Mullani |   |
|---|---|---|---|---|---|
| 5,309,555 | A | * | 5/1994 | Akins et al. | 395/157 |
| 5,805,289 | A | * | 9/1998 | Corby et al. | 356/613 |
| 5,862,252 | A | * | 1/1999 | Yamamoto et al. | 382/154 |
| 6,222,937 | B1 | * | 4/2001 | Cohen et al. | 382/154 |
| 6,363,169 | B1 | * | 3/2002 | Ritter et al. | 382/154 |
| 2003/0001835 | A1 | * | 1/2003 | Dimsdale | 345/419 |

FOREIGN PATENT DOCUMENTS

| JP | 5-107051 A | * | 4/1993 |
| JP | 6-185993 |   | 7/1994 |
| JP | 7-327977 |   | 12/1995 |
| JP | 8-336151 |   | 12/1996 |
| JP | 9-204158 |   | 8/1997 |
| JP | 2000-148649 |   | 5/2000 |

* cited by examiner

*Primary Examiner*—Brian Werner
(74) *Attorney, Agent, or Firm*—McDermott Will & Emery LLP (57) ABSTRACT

A measuring section for measuring a three-dimensional shape of an object by scanning the object, and a display section for displaying information about an area where the scanning has been already completed in accordance with the progress of the scanning are provided. Thus, an image for clarifying the area where the scanning has been already completed and an area where the scanning has not been completed yet is displayed, and the progressing status of the scanning can be grasped accurately by a user.

16 Claims, 9 Drawing Sheets

RECIPROCATING SCANNING

FIG. 3B

ONE-WAY SCANNING

THREE-DIMENSIONAL SHAPE MEASURING SYSTEM

This application is based on Japanese Patent Application No. 369029/1999 filed on Dec. 27, 1999, the contents of which are hereby incorporated by reference.

BACKGROUND OF THE INVENTION

1. Field of the Invention

The present invention relates to a three-dimensional shape measuring system for obtaining a three-dimensional shape data of an object.

2. Description of Prior Art

Generally, in a three-dimensional shape measuring a shape of an object is measured by scanning the object to be measured.

When the measurement is performed by irradiating a light onto the object and by sensing the reflected light, the object must be scanned by the irradiated light.

When the measurement is performed by observing the object with changing a viewpoint to the object, a relative position of the object and a measuring apparatus must change variously. This specification refers to scanning of the object in both case of them.

For increasing the accuracy of measurement a time duration required for scanning is elongated. As a result of that a measuring time becomes long. The measuring time also depends on a measuring method and a specification of the measuring apparatus.

The longer the measuring time, the more either the possibility is increased of entering some other object into the measuring area or of occurring the movement of a whole or a part of the object during the measurement. In such a case, sometimes, the measuring result of the measuring points partly becomes abnormal data. Even if the some other object enters into the measuring area, the measurement is not influenced by the object if the object is out of the measuring point which is changing time after time by scanning. Also, when the measuring apparatus is moved itself during the measurement, the normal measuring result could not be obtained.

In the conventional system, there is a problem that a user could not grasp the progress of the scanning. Thus, it is difficult to determine appropriately whether to continue the scanning and whether it is necessary to measure again or not, when a certain obstacle which influences the measuring result is occurred during scanning. Thus, the useless measurement or second measurement is often performed. For example, if it can be ensured that the measurement of an important part in the measuring area has been completed when the obstacle is occurred, it can be determined that further measurement is not needed.

SUMMARY OF THE INVENTION

The object of the present invention is to provide a user-friendly system by which a user can grasp the status of the progress of the scanning accurately.

Another object of the present invention is to deal with an accident which may occur during the scanning. Still another object of the present invention is to preserve the data of the area already scanned, even if the whole scanning of the measuring area has not been completed.

According to an embodiment of the present invention, a measuring section for measuring a three-dimensional shape of an object by scanning the object and a display section for displaying information about an area where the scanning has been already completed in accordance with a progress of the scanning. The display section displays the image for clarifying the portion in which the scanning is completed and the portion in which the scanning is not completed within the measuring area. As the identifying form of these portions, there are methods that only the completed portion is displayed in color while the other is displayed in black and white, or the method that the distant image of the completed portion is displayed in accordance with the measurement result, for example.

The progress of the scanning or the remaining time may be displayed by the diagram or the character as well as displaying image. Therefore, a user can determine on the basis of much more information.

Since the confirmation of the measured portion can be performed, it is possible for a user to select re-measurement or no further measurement because required data has already been obtained and more measurement is not needed. Such a selection is possible when the measuring apparatus is moved during the scanning, for example, when a user accidentally touches the apparatus so that the apparatus is moved a little. As the same, when the measurement is forcibly stopped, the selection whether or not the measured data are to be stored, i.e., to be made available, can be possible. Thus, by confirming the measured portion, the scanning can intentionally be stopped.

The other objects and features of the present invention will be more fully understood from the following detailed description with reference to the accompanying drawings.

DESCRIPTION OF THE PREFERRED EMBODIMENTS

Figure 1:
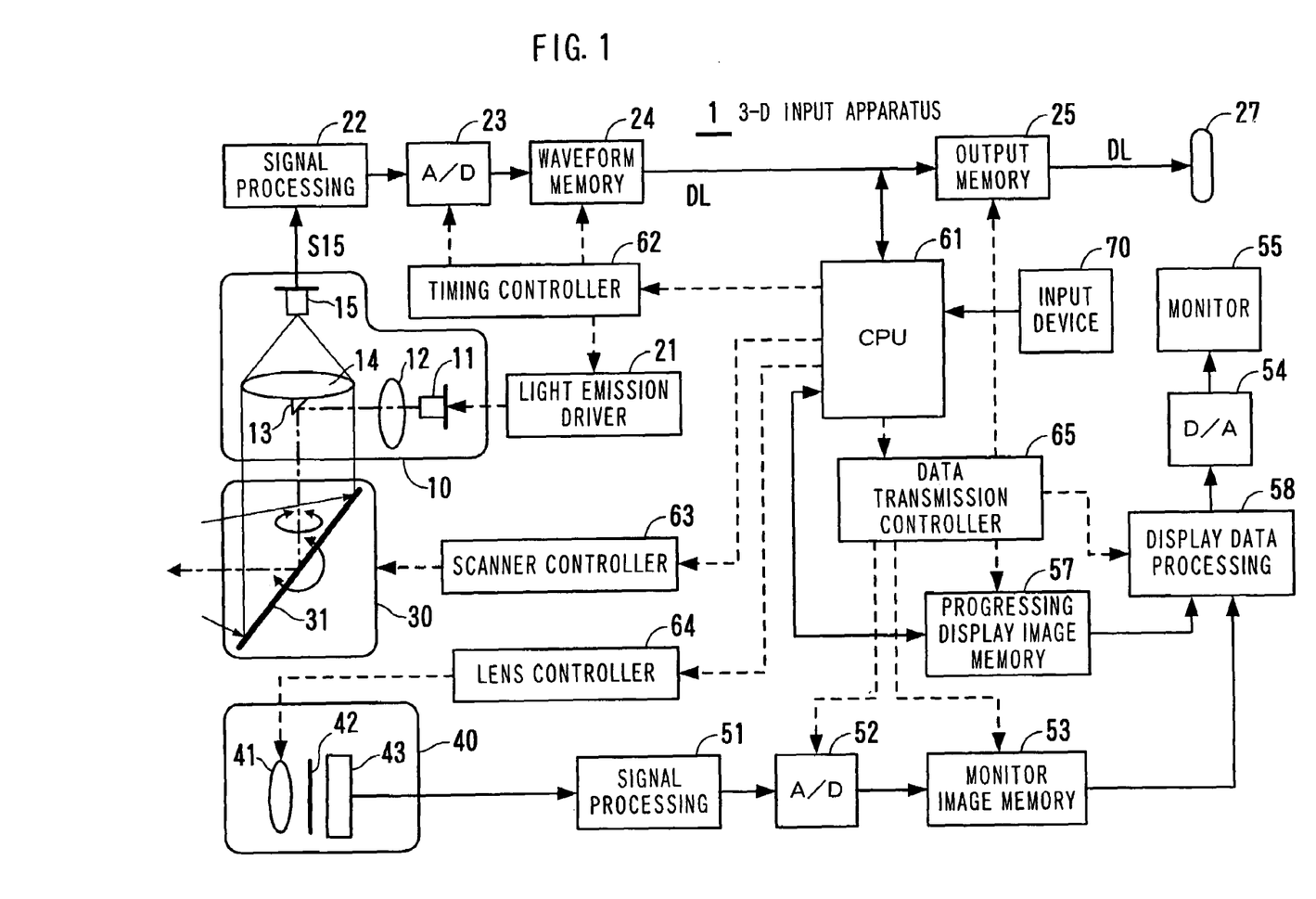
FIG. 1 is a block diagram of a three-dimensional shape measuring system of an embodiment of the present invention.

Referring to FIG. 1, each arrow of solid line indicates a flow of data, and each arrow of broken line indicates a flow of a control signal. The three-dimensional measuring apparatus 1 includes an optical system 10 for transmitting and receiving the pulsed lights, a scanning mechanism 30, an optical system 40 for taking a monitor picture, and the input means 70 for various electronic circuit components and for instructing operations. The three-dimensional measuring apparatus 1 measures the distance by a TOF (Time of Flight) method. The optical system 10 includes a laser light source (a semiconductor laser) 11, a light projection lens 12 for restricting an angle of spreading light beam, a reflection prism 13 for making an optical path, a light reception lens 14, and a photo detector (photo diode) 15.

The laser light source 11 emits pulsed lights having a pulse width of approximately 100 ns responding to power supply from the light emission driver 21. Each pulsed light propagates through the light projection lens 12 and the reflection prism 13 so as to enter the scanning mechanism 30. Then the pulsed light is reflected by the deflection mirror 31 and is directed to the outside. The pulsed light after reflected in the outside returns to the deflection mirror 31 and is focused by the light reception lens 14 so as to enter the photo detector 15. The photo detector 15 outputs a photoelectric conversion signal S15 having the amplitude corresponding to the received light quantity.

The photoelectric conversion signal S15 is amplified by the signal processing circuit 22 appropriately and sampled by an A/D converter 23 in every constant period so as to be digitized. The received data obtained by the sampling is written in a waveform memory 24 sequentially. The waveform memory 24 can memorize waveforms of the periods each corresponding to the maximum measurable distance. A CPU 61 determines the light reception time point in accordance with the received light data and calculates the time of flight (the light propagating time) from the emission time point to the light reception time point. In the process of determining the light reception time point, a barycenter operation can be used for determining the peak of pulse, so that the resolution can become higher than the method of regarding the maximum value of the data as a peak. The emission time point is determined by starting to memorize the waveform in synchronization with the light emission control. A timing controller 62 for controlling the light emission controls the light emission driver 21, the A/D converter 23, and the waveform memory 24. However, in another method, the peak can be detected by monitoring the actual light emission quantity.

In the process of calculating the time of flight, the emission and the reception of the pulsed light are repeated for increasing the number of the sampling for one measuring point so that the measurement accuracy can be increased. The CPU 61 refers to a measurement accuracy map memorized in a memory and gives an instruction to the timing controller 62 and scanner controller 63 corresponding to an accuracy that is set for each measuring point. The CPU 61 calculates the time of flight on the basis of the received light data of the predetermined number. Then the CPU 61 calculates the distance data DL corresponding to the distance to the object from the time of flight and the light propagating speed ($3 \times 10^8$ m/s) and writes the data into the output memory 25. The distance data DL is transferred to external equipment (such as a computer) connected via a connector 27 at an appropriate time. At the time the imaging information of the measuring area is added to the distance data DL as a reference data. A data transfer controller 65 is provided for accessing the output memory 25 and an image memory 53 as will be mentioned later. The configuration of the apparatus concerning the output to the outside is not limited to the example. For example, the received light data can be outputted by the three-dimensional measuring apparatus 1, and the distance data DL can be determined by an external computer. The output of the three-dimensional measuring apparatus 1 can be the photoelectric conversion signal S15. In addition, there is a variation in which an external apparatus performs the control of the light emission driver 21.

In the three-dimensional measuring apparatus 1, the deflection mirror 31 is driven intermittently so as to change the emission direction sequentially in the vertical direction or the horizontal direction per the predetermined angle. Each emission direction corresponds to the sampling point (measuring point) in the three-dimensional input. During the period of measuring a distance in one emission direction, the drive of the deflection mirror 31 is stopped temporarily, and the emission direction is maintained.

The optical system 40 includes a magnification changeable lens 41, an infrared cutting filter 42 and a two-dimensional imaging device (such as a CCD or a CMOS sensor) 43 and performs shooting in a field of view of the scannable area (the virtual surface). The lens 41 is arranged so that the optical axis of the lens 41 becomes parallel with the emission direction when emitting the pulsed light in the front direction and so that a principal point and the start point of the emission are located on the same plane that is perpendicular to the optical axis. The lens 41 is controlled by the lens controller 64. The output of the imaging device 43 is digitized by the A/D converter 52 after passing through the signal processing circuit 51 and is temporarily memorized by the monitor image memory 53.

Before the scanning is started, imaging of the measuring area is performed continuously in the predetermined interval (for example, several frames/sec, or one main scanning period). The stored contents of the monitor image memory 53 are updated every time of imaging, the current frame (color image) is readout from the monitor image memory 53 and sent to the display data processing section 58. The display data processing section 58 outputs a frame from the monitor image memory 53 as it is. The frame is converted into the image signal by the D/A converter 54 and displayed by the monitor 55. At the beginning of the scanning, the CPU 61 sends the start instruction to the timing controller 62 and informs the data-transferring controller 65 of a measuring point (an angular position of the main and sub scanning direction of the deflection mirror). The data-transferring controller 65 controls the display data processing section 58 corresponding to the measuring point. During the scanning, the display data processing section 58 readouts the image corresponding to the progressing step of the scanning from the progressing image display memory 57, and generates a monitor image based on the frame from the monitor image memory 53, and outputs the monitor image to the D/A converter 54. With the monitor image, the portion of the measuring area in which the scanning is completed and the portion in which the scanning is not completed are identified. For example, when the distance image corresponding to the measuring result is displayed, in the display data processing section 58, the distance image from the progressing image display memory 57 is selected for the portion in which the scanning is completed in the measuring area, and the frame from the monitor image memory 53 is selected for other portions. During the scanning period, either the measuring area may be displayed using the still image frame taken at the beginning of the scanning or by taking repeatedly an image periodically the portion of the monitor images in which the measurement is not completed may be displayed in real time.

The user can confirm the measuring area before starting of the measurement by observing the monitor display, and directly grasp the progress of the scanning after the measurement is started.

Figure 2:
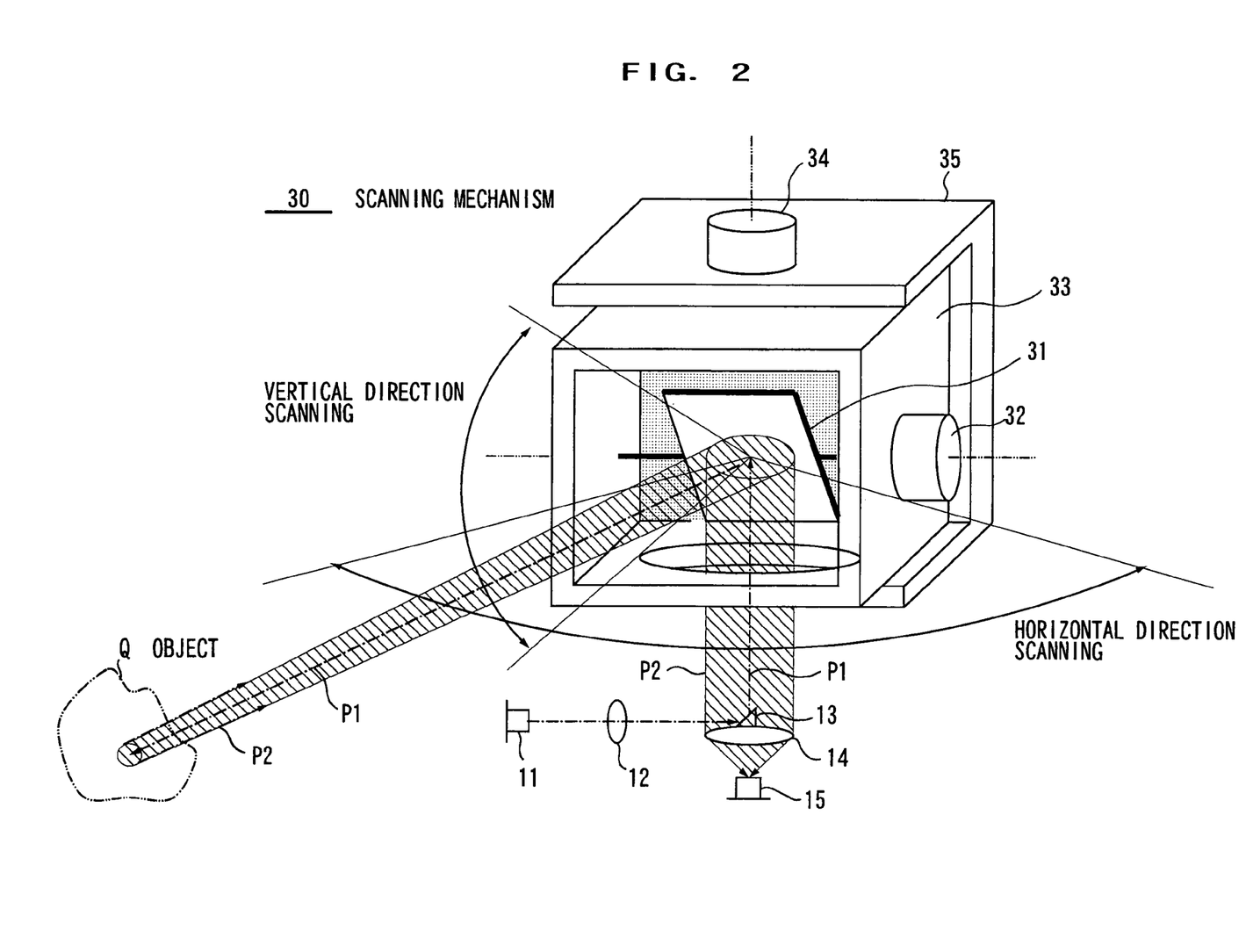
FIG. 2 is a perspective view of the scanning mechanism.

FIG. 2 is a perspective view showing a configuration of the scanning mechanism.

The scanning mechanism 30 includes a deflection mirror 31, a motor 32 for the vertical deflection, a mirror box 33, a motor 34 for the horizontal deflection and a fixed frame 35. In the vertical deflection, the mirror box 33 is fixed, and the deflection mirror 31 in the mirror box 33 rotates. The horizontal deflection is performed by rotating the mirror box 33 as a whole. Each bottom of the mirror box 33 and the fixed frame 35 has a through hole of a sufficient size for passing the transmission light beam and the reception light beam.

In the mirror arrangement shown in FIG. 2, the pulsed light P1 that entered the deflection mirror 31 from the deflection prism 13 is deflected to the direction corresponding to the angular position of the deflection mirror 31 and is directed to the object Q in the outside. The pulsed light P1 that reached the object Q is reflected on the surface of the object. The reflection is a diffusing reflection as long as the surface of the object is not a mirror face. Therefore, even if the incident angle of the light is normal to the surface of the object, at least a part of the pulsed light P2 is directed to the three-dimensional measuring apparatus 1. The pulsed light P2 that returned to the three-dimensional measuring apparatus 1 is deflected by the deflection mirror 31, passes through the light reception lens 14 and enters the photo detector 15.

Figure 3A:
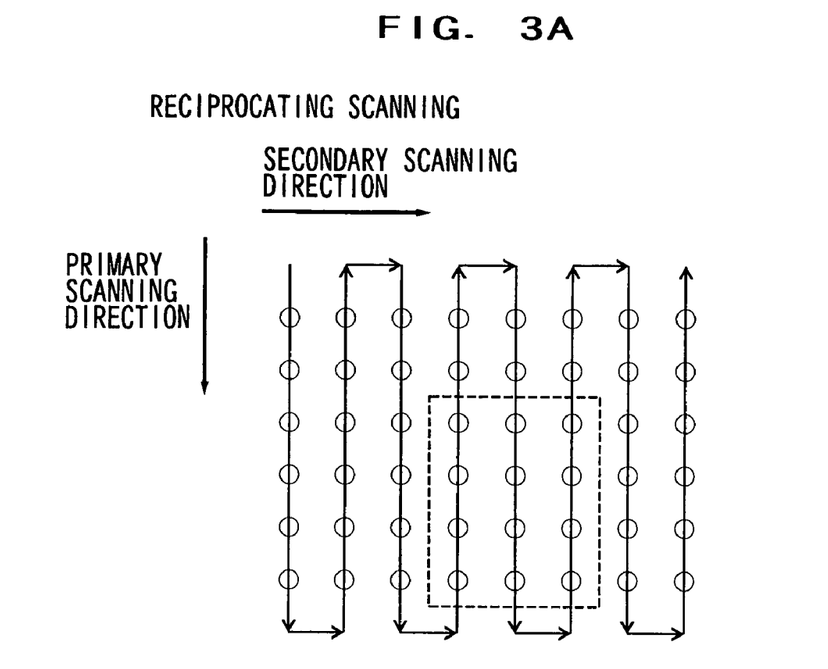
FIGS. 3A and 3B are schematically views of the scanning form.
Figure 3B:
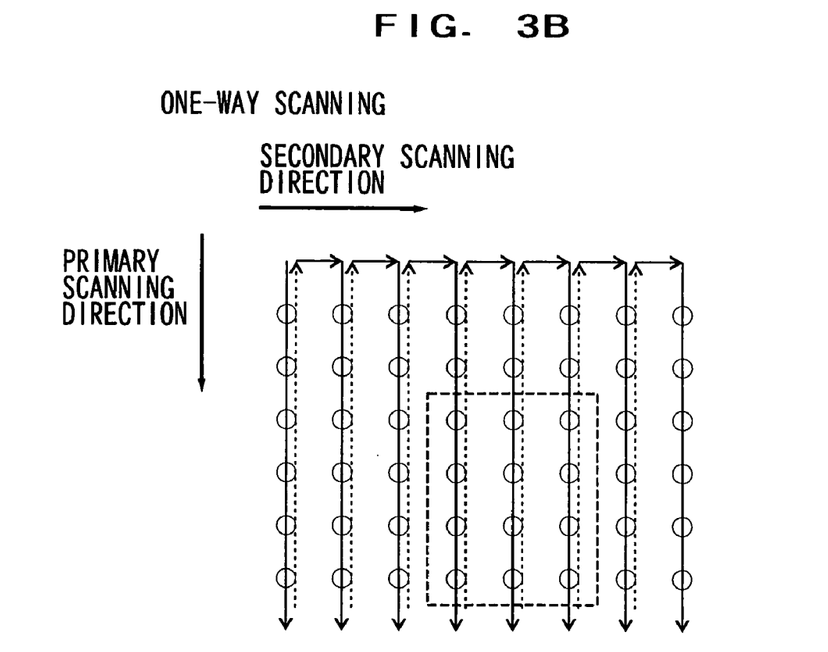

If the main scanning is reciprocating form as shown in FIG. 3A, an object can be scanned efficiently. However, if there is a misregistration of the mirror position due to the rotation direction of the deflection mirror, the one-way form of the main scanning as shown in FIG. 3B can reduce a variation of the measurement position.

Figure 4A:
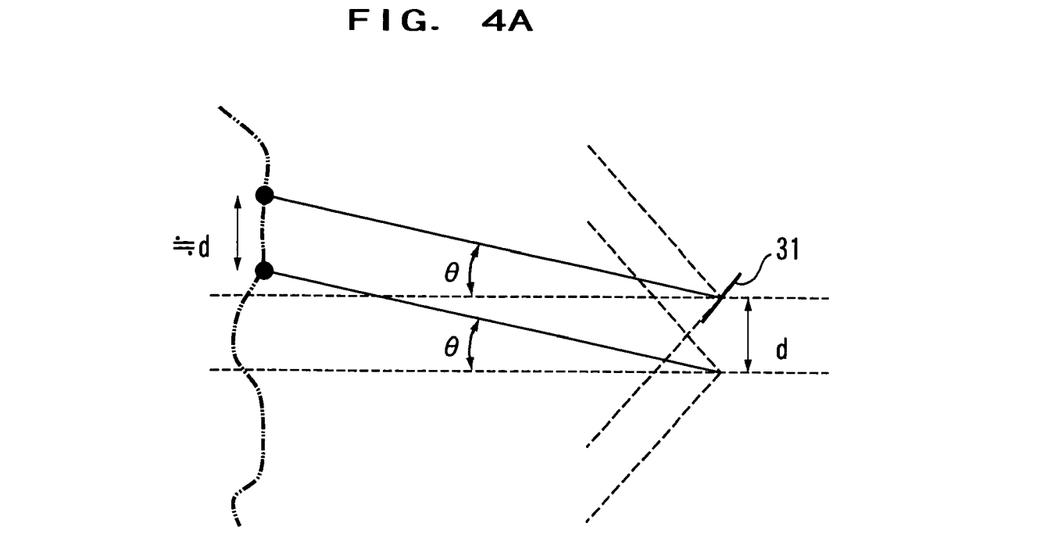
FIGS. 4A and 4B are schematically views for illustrating the modification example of the imaging light path.
Figure 4B:
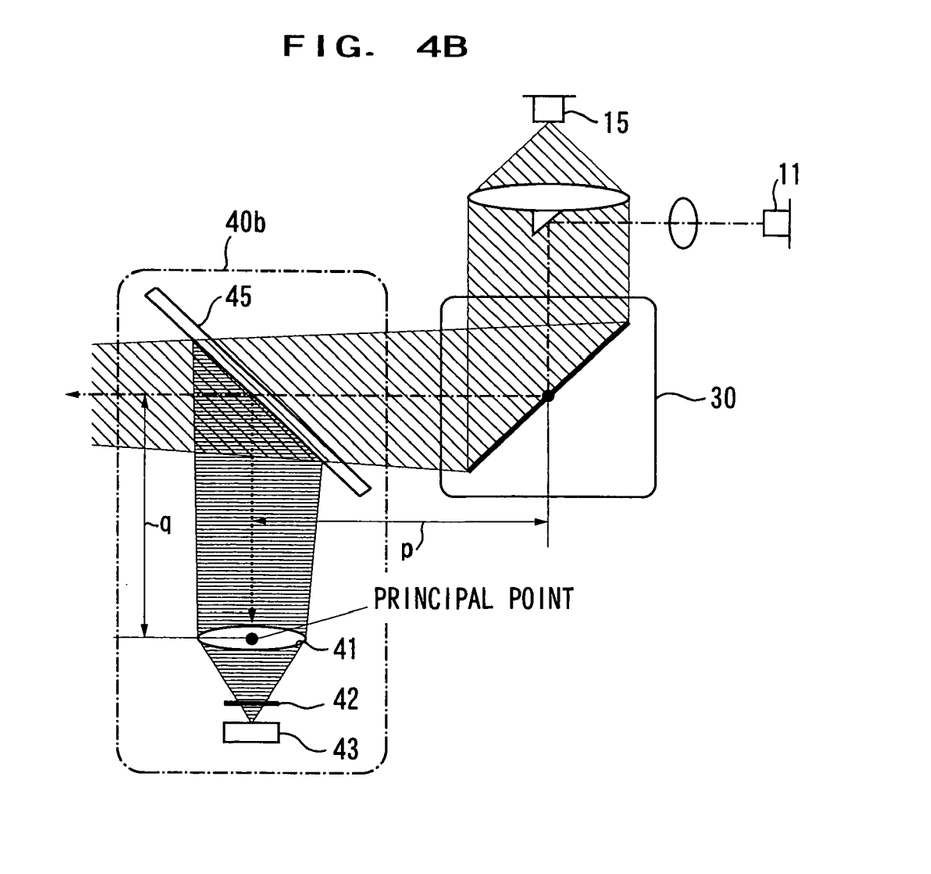

When the optical axis of the monitor imaging is set parallel to the emission direction toward the front side, the point on the monitor image and the assigned point to which the pulsed light is actually projected differ by a distance between the optical axes as shown in FIG. 4A. Normally, this gap is not concerned substantially. However, if the gap is made as small as possible, a half mirror 45 can be used as shown in FIG. 4B so that the optical axis for measuring and the optical axis for imaging are identical to each other in the optical system 40b. The half mirror 45 is arranged so that the optical length p to the start point of the projection is equal to the optical length q to the principal point.

Figure 5:
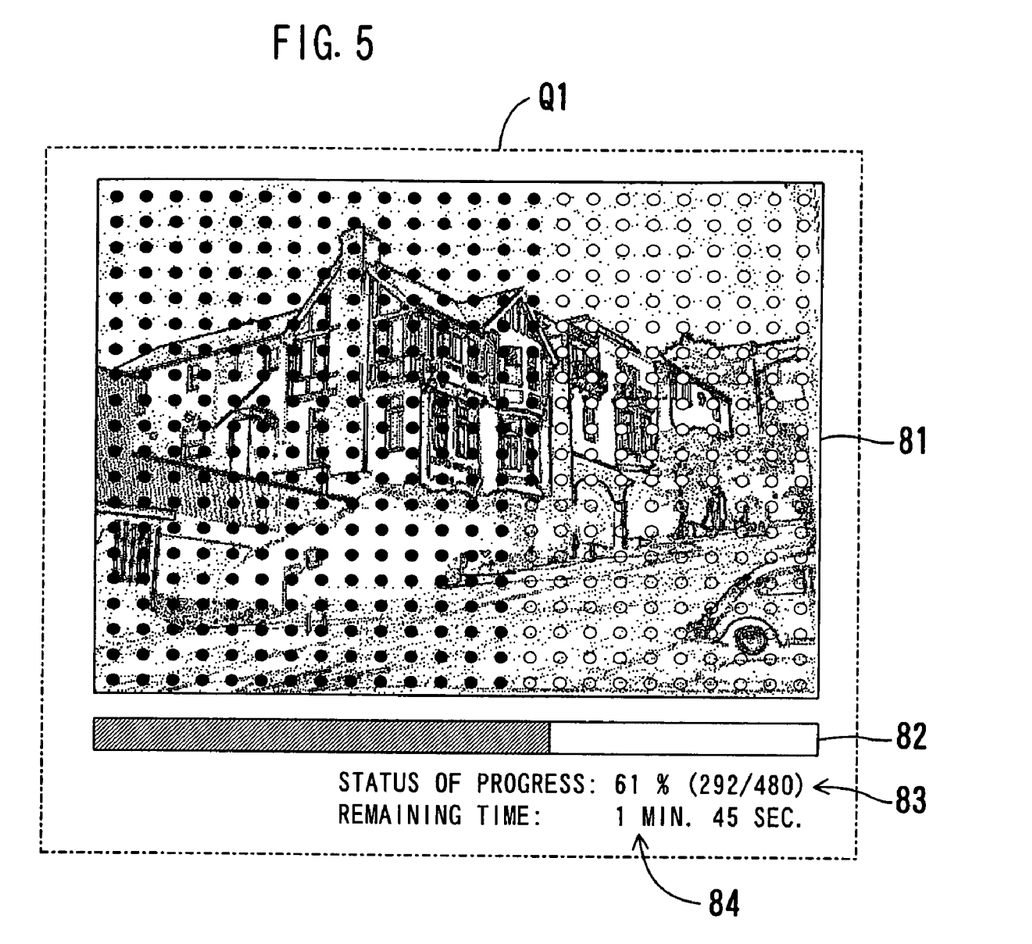
FIG. 5 is a schematically view of the monitor display according to the present invention.

FIG. 5 is a schematically view of the monitor display according to the present invention.

During the scanning, the progressing status image Q1 is displayed by the monitor 55. The progressing status image Q1 includes the monitor image 81 utilizing the imaging data, the diagram (bar) 82 and the character string 83 showing the ratio of the measured portion, and the character string 84 showing a remaining time of the scanning. The transmission data of these components are updated at every moment according to the scanning.

The monitor image 81 before the scanning is started is a color image taking the measurement area. When the scanning is started, the monitor image 81 displays the result of the measurement on the portion in which the scanning is completed in the measurement area. For example, the result of the measurement is represented by the density distance image which is light at a short distance and dark at a long distance (8 bit; 256 gradation), or by the pseudo color distance image representing from a short distance to a long distance with the red to blue color. The updating interval may correspond to the predetermined number of the measuring points, such as one or the several point, or the predetermined number of the primary scanning lines, such as one line or the several lines. In FIG. 5, the scanned pixel is represented by the dark circle and the other pixel is represented by the white circle. In practice, the distance image is displayed in the dark circled portion of the monitor image 81. In this example, since the measurement result is displayed in real time as well as the progressing status, a user can observe the progress while confirming the measuring quality.

There are methods for displaying identifiably the scanned portion and the other as follows:

(1) The color image showing the measuring area is displayed in half tone previously and replaces the scanned portion in a full color image.

(2) The image showing the measuring area is displayed in a monochrome (black and white) previously and replaces the scanned portion in a color image.

(3) The image showing the measuring area is not displayed (an initial image such as a dark out or a white out is displayed) previously and change the scanned portion in a color image or the distance image based on the measuring result.

Figure 6:
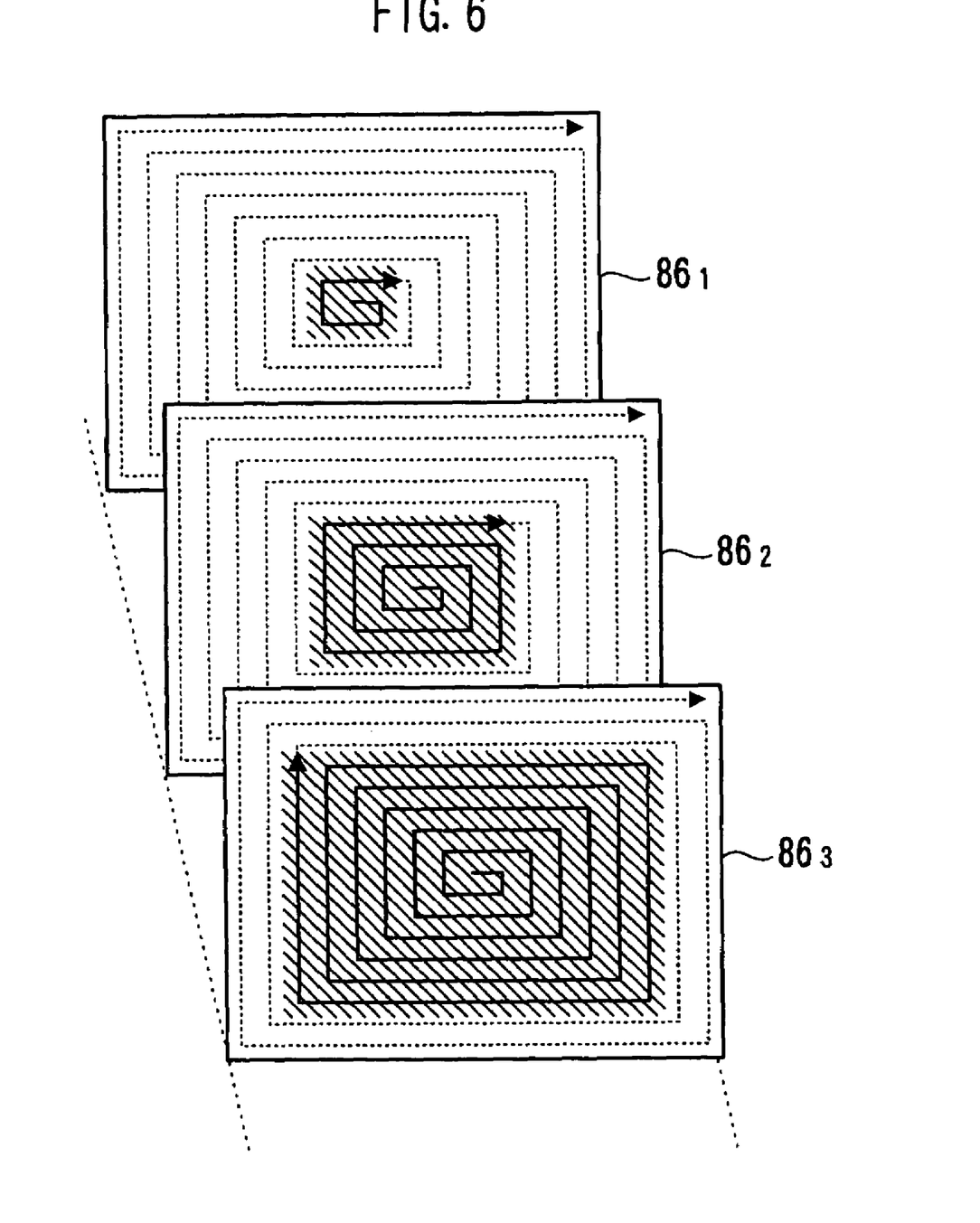
FIG. 6 is a schematically view-of the monitor display of the modification example of the scanning order.

FIG. 6 shows a schematic diagram of the modification of the scanning order. In the FIG. 6, the hatched portion represents the portion in which the scanning is completed.

In this example, the scanning is performed spirally from the near center to the outside. Generally, since the apparatus is located so that the main portion of an object to be measured is positioned near the center of the measuring area, using the spiral scanning the measuring of important area is completed earlier than the other area. By the monitor image (three images are shown in FIG. 6) $86_1$, $86_2$, and $86_3$ are updated every moment, the progress status of the scanning is confirmed. If the measurement of the important or required portion is completed, the measuring can be stopped (forcibly) and thereby the useless measurement can be omitted. The three-dimensional measuring apparatus 1 has a function of storing the result of the measurement obtained from the start of the scanning to the stop of the scanning. The update timing of the monitor image 86 may be selected in a predetermined period as the above embodiment or coincide with the changing of the scanning direction.

Figure 7:
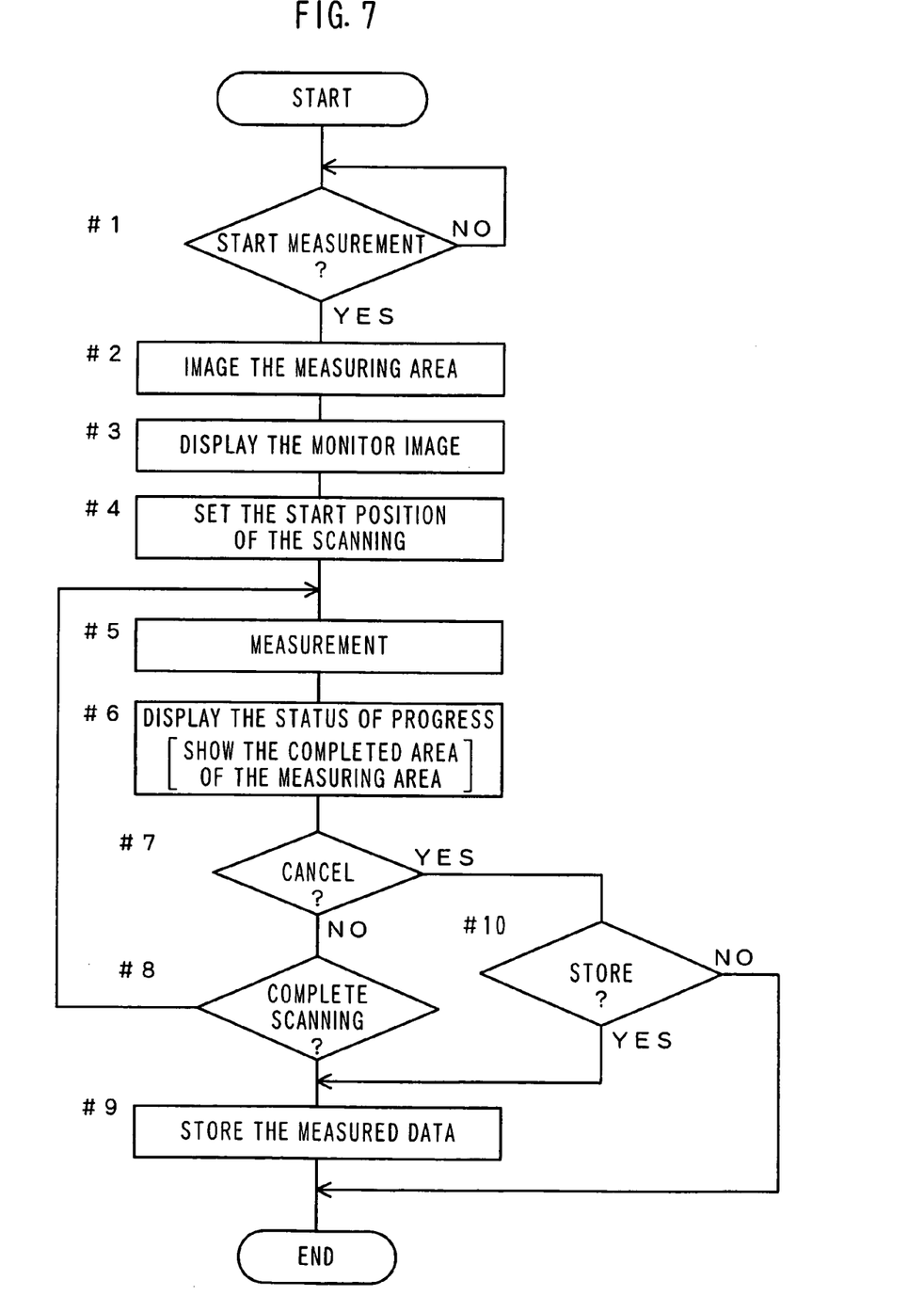
FIG. 7 is a flowchart schematically showing a measuring operation.

FIG. 7 is a flow chart showing the measuring operation schematically.

The three-dimensional measuring apparatus 1, in response to the start instruction by the input means 70, after imaging the measuring area and displaying the image data, positions the deflection mirror 31 at the scanning start position (#1–#4). The CPU 61 displays the progressing status on every scanning of the predetermined number of the measuring point (#5, #6). If the cancel operation is not occurred, the displayed monitor image is sequentially updated until the entire scanning is completed (#8). When the scanning is completed, the distance data DL temporarily stored in the internal memory is outputted and written onto the output memory 25 as the result of the measurement (#9). If the cancel operation is executed during the scanning, the scanning is stop immediately. After the cancel operation, when storing data is instructed, the distance data DL obtained until then by the scanning is stored (#10).

In the embodiments as described above, the configuration for measuring distance by the time duration from the radiation of the pulsed light until receiving the light pulse, but the measuring method is not limited to this. The present invention can be applied to such as the device for measuring distance based on the triangular surveying by emitting the beam spot light and using a sensor (for example, PSD, CCD, and CMOS sensor) which can detect the beam reception position. Further, the present invention is not only applied to the active method for measuring having a light emitting system, but also applied to the passive method for measuring distance such as the stereo system.

Next, the three-dimensional measuring apparatus 1B for measuring the three-dimensional shape of the object by a shape form silhouette method is described.

Figure 8:
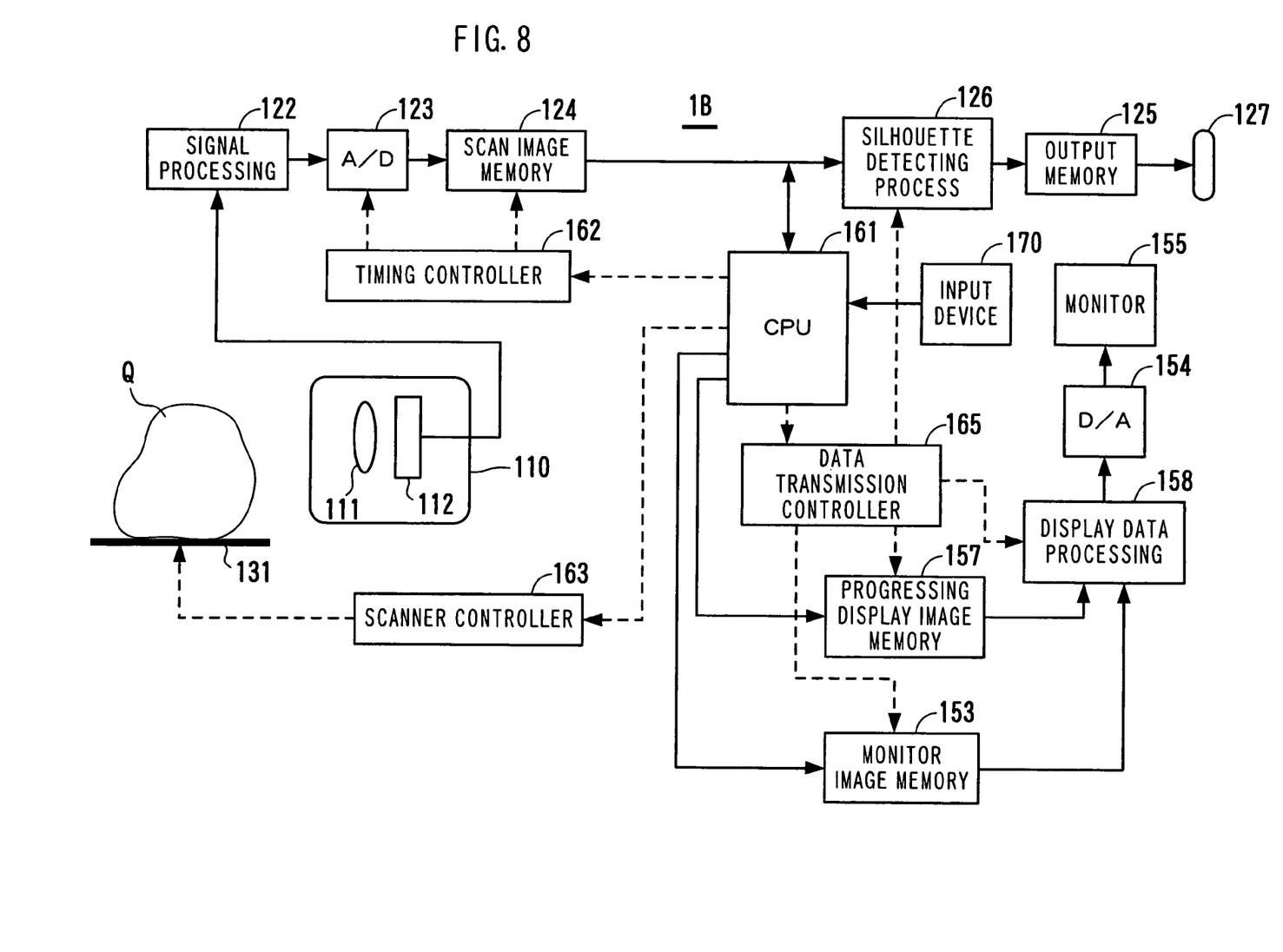
FIG. 8 is a block diagram of a three-dimensional shape measuring system of the other embodiment of the present invention.

Referring to FIG. 8, an object Q is put on the rotary base 131. The object Q is imaged by the optical system 110 from a variety of the direction by rotating the rotary base 131.

The optical system 110 includes a magnification changeable lens 111, and the two-dimensional imaging device 112. For example, a CCD sensor, and CMOS sensor can be used as the imaging device 112. The positional relationship of the optical system 110 and the rotating axis of the rotary base 131 is fixed for each time of the measurement and it is known.

An output of the imaging device 112 is digitized by the A/D converter 123 through the signal processing circuit 122, and stored in the scanning image memory 124. The two-dimensional image stored in the scanning image memory 124 is also called a sampling image or a scanning image. The A/D converter 123 and the scanning image memory 124 execute the process in a predetermined timing based on the control signal from a timing controller 162.

A silhouette detecting processing section 126 extracts only the outline from each sampling image stored in the scanning image memory 124, and generates a silhouette image. An output memory 125 stores the data in which each silhouette image corresponds to each scanning position.

Figure 9A:
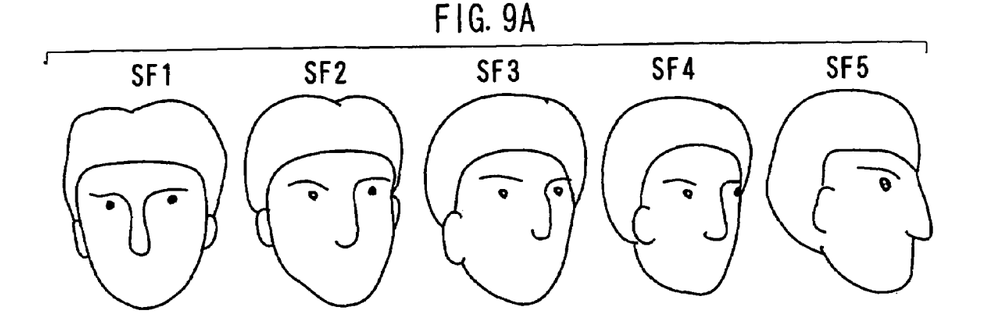
FIG. 9A is a diagram showing an example of the sampling image.
Figure 9B:
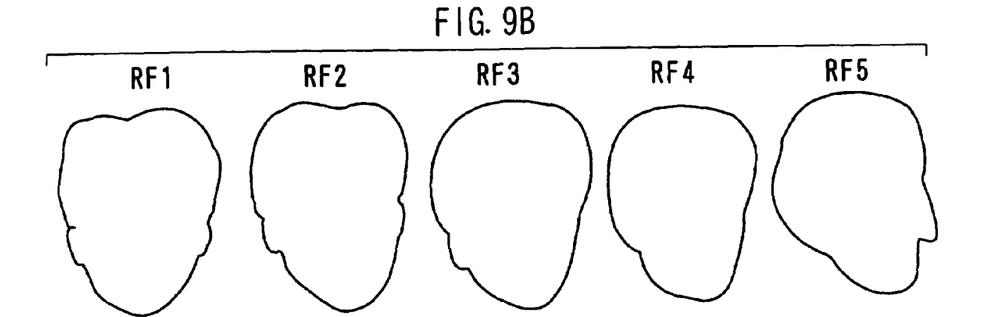
FIG. 9B is a diagram showing an example of a silhouette image corresponding to each sampling image.

FIG. 9A shows examples of the sampling images SF1–SF5 sequentially stored in the scanning image memory 124 while rotating the rotary base 131. FIG. 9B shows the examples of the silhouette images RF1–RF5 corresponding to the sampling images SF1–SF5, respectively.

Based on such a large number of the sampling images SF1–SF5, the three-dimensional shape data of the object can be calculated of the object by using the stereo imaging method, for example.

At the start timing of the scanning, the two-dimensional image of the object Q, i.e., the first sampling image (initial image) SF1 stored in the scanning image memory 124, is stored in the monitor image memory 153. The initial image SF1 stored in the monitor image memory 153 is used for displaying the monitor image 81B to confirm the progressing status of the scanning.

Figure 10:
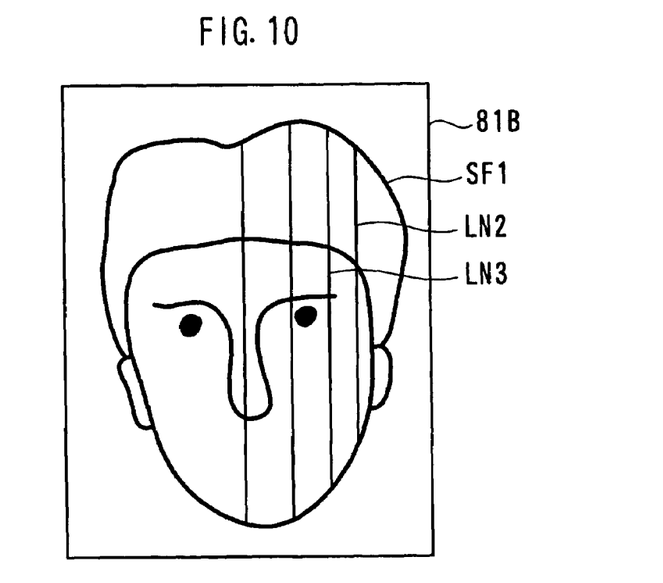
FIG. 10 is a diagram showing another example of the monitor display.

FIG. 10 shows the example of the monitor image 81B.

The monitor image 81B shown in FIG. 10 is displayed as follows. Thus, the end portion of each silhouette image RF1–RF5 as shown in FIG. 9B should be watched. For example, by the rotating of the rotary base 131, the right end portion of each silhouette image RF1–RF5 is sequentially changed such as a hair position, a right end position of an eyebrow, an eye position, a nose position. Then, vertical lines L2, L3 . . . are displayed on the initial image SF1 corresponding to the right end portion of each silhouette image RF1–RF5.

For displaying the monitor image 81B, the display data processing section 158 generates the image to which lines L2, L3 . . . already detected as a silhouette are added on the initial image SF1 readout from the monitor image memory 153. The generated monitor image 81B is displayed as the part of the progress status image, on the monitor 155.

The user can confirm the progressing status of the measuring by observing the monitor image 81B.

The other components of the three-dimensional measuring apparatus 1B shown in FIG. 8 are the same as those of the three-dimensional measuring apparatus 1.

According to the above-described embodiments, a user can grasp the progress status of the scanning accurately. A user can deal with an accident which may occur during the scanning. Even if the scanning is not entirely completed in the measuring area, the data of the scanned area can be stored. The compensation for measurement time can be provided. Therefore, a user-friendly three-dimensional measuring system can be provided.

In the above embodiments, a whole or partial configuration, process contents, order of the process, and so forth of three-dimensional measuring apparatus 1, 1B can be modified suitably along with the scope of the present invention.

What is claimed is:

1. A three-dimensional shape measuring system comprising:
    a measuring section for measuring a three-dimensional shape of an object by scanning the object;
    a display section for displaying information about an area where the scanning has been completed by the measuring section in accordance with a progress of the scanning; and
    an imaging section for taking a two-dimensional image of the object, wherein
    the display section displays information about an area where the scanning has been completed by the measuring section in accordance with a progress of the scanning by displaying the two-dimensional image of the object and identifiably showing an area of the two-dimensional image where the scanning has already completed as well as an area where the scanning has not completed yet, and
    the display section displays all the measuring points prior to the scanning by superimposing visual indicators of the points on the two-dimensional image, and displays a progress status of the scanning along with the progress of the scanning by changing the display state of the measuring points that were displayed in advance.

2. The three-dimensional shape measuring system according to claim 1, wherein the measuring section includes:
    a scanning section for changing a measuring direction; and
    a distance measuring section for measuring a distance to the object in each measuring direction of the scanning section; and
    the measuring section measures the three-dimensional shape of the object based on the measured distance.

3. The three-dimensional shape measuring system according to claim 2, wherein the measuring section calculates a distance to each point on the object, based on a flight time of a pulsed light from a transmitting time of a pulsed light to a receiving time of the pulsed light reflected from the object.

4. The three-dimensional shape measuring system according to claim 1,
    wherein the information displayed is a message image indicating the status of progress of the scanning.

5. The three-dimensional shape measuring system according to claim 4, wherein the message image is an image indicating a degree of progress of the scanning as a percentage.

6. The three-dimensional shape measuring system according to claim 1, wherein the measuring section measures the area displayed by the display portion substantially uniformly.

7. The three-dimensional shape measuring system according to claim 1, wherein the two-dimensional image of the object in the area where the scanning is finished includes information about a three-dimensional shape based on the measurement result.

8. The three-dimensional shape measuring system according to claim 1, wherein a distance image is displayed for the area where the scanning is finished.

9. A three-dimensional shape measuring system comprising:
   a measuring section for measuring a three-dimensional shape of an object by scanning the object;
   an imaging section for taking a two-dimensional image of the object including an area to be measured by the measuring section; and
   a display section for displaying the two-dimensional image of the object taken by the imaging section and identifiably showing an area of the two-dimensional image where the scanning has already completed as well as an area where the scanning has not completed yet based on a degree of progress in the measuring section, wherein
   the display section displays all the measuring points prior to the scanning by superimposing visual indicators of the points on the two-dimensional image, and displays a progress status of the scanning along with the progress of the scanning by changing the display state of the measuring points that were displayed in advance.

10. The three-dimensional shape measuring system according to claim 9, wherein the measuring section includes:
    a light source;
    a scanner for scanning the object by deflecting a light from the light source;
    a sensor for receiving a light deflected by the scanner and reflected from the object; and
    a calculating section for calculating a distance to each scanning position of the object based on an output of the sensor.

11. The three-dimensional shape measuring system according to claim 9, wherein the measuring section includes:
    a two-dimensional imaging device;
    a scanner for changing an imaging direction of the two-dimensional imaging device;
    an outline generating section for generating an image formed by an outline of each image obtained by the two-dimensional imaging device on each scanning position; and
    a processing section for generating information with respect to a three-dimensional shape of the object, based on the image generated by the outline generating section.

12. The three-dimensional shape measuring system according to claim 9, wherein the display section displays the three-dimensional shape which is measured.

13. The three-dimensional shape measuring system according to claim 9, wherein the display section displays during the scanning by the measuring section.

14. The three-dimensional shape measuring system according to claim 13, wherein the display section updates display contents a plurality of times during the scanning by the measuring section.

15. The three-dimensional shape measuring system according to claim 9, further comprising an instructing section for instructing a stop of the measurement by the measuring section during measurement.

16. The three-dimensional shape measuring system according to claim 15, further comprising:
    a storage section for storing a result of a measurement; and
    a control section for controlling the measuring section to store a result of a measurement already measured when the stop of measuring is instructed by the instructing section.

* * * * *